United States Patent
Aoki

(10) Patent No.: US 6,808,201 B2
(45) Date of Patent: Oct. 26, 2004

(54) OCCUPANT SENSOR

(75) Inventor: Hiroshi Aoki, Ritto (JP)

(73) Assignee: Takata Corporation, Tokyo (JP)

( * ) Notice: Subject to any disclaimer, the term of this patent is extended or adjusted under 35 U.S.C. 154(b) by 187 days.

(21) Appl. No.: 10/097,589

(22) Filed: Mar. 15, 2002

(65) Prior Publication Data
US 2002/0129986 A1 Sep. 19, 2002

Related U.S. Application Data

(60) Provisional application No. 60/276,109, filed on Mar. 16, 2001, and provisional application No. 60/303,782, filed on Jul. 10, 2001.

(30) Foreign Application Priority Data

Nov. 20, 2001 (JP) .................................. 2001-354732

(51) Int. Cl.[7] .............................................. B60R 21/32
(52) U.S. Cl. ....................................... 280/735; 180/271
(58) Field of Search ........................ 280/735; 180/271, 180/282, 268, 273

(56) References Cited

U.S. PATENT DOCUMENTS

| | | | |
|---|---|---|---|
| 5,454,591 A | * 10/1995 | Mazur et al. ................ | 280/735 |
| 5,605,348 A | 2/1997 | Blackburn et al. ........... | 280/735 |
| 5,618,056 A | 4/1997 | Schoos et al. .............. | 280/735 |
| 5,626,359 A | 5/1997 | Steffens, Jr. et al. ........ | 280/735 |
| 5,636,864 A | 6/1997 | Hori .......................... | 280/735 |
| 5,831,342 A | * 11/1998 | Vivacqua et al. .......... | 307/10.1 |
| 5,906,393 A | * 5/1999 | Mazur et al. ................ | 280/735 |
| 6,099,032 A | 8/2000 | Cuddihy et al. ............ | 280/735 |
| 6,186,538 B1 | * 2/2001 | Hamada et al. ............. | 280/735 |
| 6,264,236 B1 | * 7/2001 | Aoki .......................... | 280/735 |
| 6,282,473 B1 | * 8/2001 | Steffens, Jr. ................ | 701/45 |
| 6,341,252 B1 | * 1/2002 | Foo et al. ..................... | 701/45 |

FOREIGN PATENT DOCUMENTS

| | | |
|---|---|---|
| JP | 9193698 | 7/1997 |
| JP | 9226517 | 9/1997 |
| JP | 9254739 | 9/1997 |
| JP | 2000127890 A | 5/2000 |
| JP | 2000289564 | 10/2000 |
| JP | 2001278003 | 10/2001 |

* cited by examiner

Primary Examiner—David R. Dunn
(74) Attorney, Agent, or Firm—Foley & Lardner LLP

(57) ABSTRACT

To provide an occupant sensor that can reliably judge whether the object loaded on a seat is a child restraint system or an adult even when the child restraint system is fixed by using a seatbelt. The occupant sensor detects whether or not the seatbelt extraction amount sensor (switch) is ON. When the extraction amount sensor is ON, the object loaded on the seat is judged as being a child restraint system or a child. When the seatbelt extraction amount sensor is not ON, the sensor determines whether or not the value of load detected by the seat load sensor is not less than 30 kg. When the load is less than 30 kg, the occupant is judged as being an adult. When the load is less than 30 kg, the occupant is judged as being a child or a child restraint system.

9 Claims, 5 Drawing Sheets

OCCUPANT SENSOR

CROSS-REFERENCE TO RELATED APPLICATIONS

This application claims priority to and the benefit of U.S. Provisional Patent Application Nos. 60/276,109 filed on Mar. 16, 2001 and 60/303,782 filed on Jul. 10, 2001, both of which are incorporated by reference herein in their entirety.

BACKGROUND OF THE INVENTION

The present invention relates to an occupant sensor for identifying the category of the human being and the child restraint system loaded on the seat of a passenger vehicle.

An airbag apparatus is normally provided in the passenger vehicle for protecting occupants in case of accident such as a collision. The airbag is controlled in such a manner that when the occupant is a child or an infant seated on the child restraint system, the airbag is deployed softly or even not deployed.

In order to perform such a control, it is necessary to judge whether the human being loaded on the seat is an adult or a child, and whether it is a human being or a child restraint system. Hitherto, such method that the weight of the object loaded on the seat is weighed first, and then the category of the occupant and the existence of the child restraint system are judged has been employed in order to achieve this object; for example, a method for installing a load sensor under the seat for measuring the weight of the object loaded on the seat, and judging the object loaded on the seat as being an adult when the weight is not less than a predetermined value (for example 30 kg), and as being a child or a child restraint system when it is less than the predetermined value.

However, the method described above has a following problem. As one of the methods for fixing a child restraint system on the seat, there is a method of fixing it by using a seatbelt. In this case, since the seatbelt fixes the child restraint system with a strong force, a tensile force on the seatbelt is applied to the load sensor, and thus there is a possibility where a larger load than the actual load of the child restraint system loaded thereon would be detected be the load sensor. In such a case, the object loaded on the seat may be misjudged as being an adult even when an infant is seated on the child restraint system.

SUMMARY OF THE INVENTION

With such a circumstance in view, the object of the present invention is to provide an occupant sensor in which the misjudgment by the possible influence of a tensile force on the seatbelt described above can be prevented, and whether the object on the seat is a child restraint system or an adult can be identified reliably even when the child restraint system is fixed by the seatbelt.

According to a first embodiment of the present invention, an occupant sensor for identifying the category of an occupant and the presence of a child restraint system on a seat of a passenger vehicle is provided. The occupant sensor comprises a seat load sensor for detecting the weight of the occupant seated on the seat or the object loaded on the seat, and a seatbelt extraction amount sensor for detecting the extracting amount of the seat belt is not less than a predetermined amount. The sensor is configured so that (1) when the detected signal of the seatbelt extraction amount sensor is ON, the object loaded on the seat is judged as being a child restraint system irrespective of the value of the seat load sensor; and (2) when the detected signal of the seatbelt extraction amount sensor is OFF, (a) when the value from the seat load sensor is less than a predetermined value, the object loaded on the seat is judged as being a child restraint system or a child; and (b) when the value from the seat load sensor is not less than the predetermined value, the object loaded on the seat is judged as being an adult.

In this measure, by providing a seatbelt extraction amount sensor that is turned on when the full amount of seatbelt is unwound, and judging the object loaded on the seat as being a child restraint system when the sensor is turned ON irrespective of the output of the seat load sensor, identification between a state in which a child restraint system is loaded and a state in which an adult is seated can be made.

When the seatbelt extraction amount sensor is OFF, the object loaded on the seat should simply be judged as being a child restraint system or a child when the value from the seat load sensor is less than a predetermined value, and that an adult is seated when the value from the seat load sensor is not less than the predetermined value.

The seatbelt extraction amount sensor can be easily realized, for example, by mounting a rotary encoder on the spool of the seatbelt retractor device and judging whether the seat belt is unwound by a predetermined amount according to the output thereof.

Employing the full amount of the seat belt as the predetermined amount, or allowing the sensor to be actuated when the full amount of the seatbelt is unwound eliminates misjudgment of an adult with large physic on the seat as being a child restraint system. The same thing can be said for the seatbelt extraction amount sensor for other means.

According to a second embodiment of the invention, an occupant sensor for identifying the category of an occupant and the presence of a child restraint system on the seat of a passenger vehicle is provided. The occupant sensor comprises: a seat load sensor for detecting the weight of the occupant seated on the seat or the object loaded on the seat, and a seatbelt extraction amount sensor for detecting the extracting amount of the seat belt is not less than a predetermined amount; wherein
  (a) when the value from the seat load sensor is less than a predetermined value, the object loaded on the seat is judged as being a child restraint system or a child. The sensor is configured so that: (b) when the value from the seat load sensor is not less than the predetermined value, the object loaded on the seat is judged as being an adult; and wherein when the detected signal from the seatbelt extraction amount sensor is ON, the predetermined value is set to the larger value than the case where it is OFF.

According to the second embodiment, when an adult with an extraordinarily large physic is seated, the detected signal from the seatbelt extraction amount sensor may be turned ON since a large amount of seatbelt is unwound, whereby the object loaded on the seat may be misjudged as being a child restraint system. In this measure, the basic method of judgment is that when the value from the seat load sensor is less than a predetermined value, the object loaded on the seat is judged as being a child restraint system or a child, and when the value from the seat load sensor is not less than the predetermined value, the object loaded on the seat is judged as being an adult. When the detected signal from the seatbelt extraction amount sensor is ON, the predetermined value, which is a threshold value, is set to the larger value than in the case where it is OFF.

The larger value should simply be set to the value larger than the value detected by the seat load sensor when a child restraint system is fixed on a seat by a seatbelt and an infant is seated thereon. This eliminates misjudgment of the object loaded on the seat as being a child restraint system when an adult with extraordinarily large physic is seated, and an adult is reliably differentiated from a child restraint system.

According to a third embodiment of the invention, an occupant sensor arranged as in the first and second embodiments mentioned above, may further comprise a buckle switch for detecting engagement between a buckle and a tongue of the seat belt, wherein the ON signal from the seatbelt extraction amount sensor is considered to be effective only when the signal from the buckle switch is ON.

The seatbelt is normally brought into a fastened state by engaging a tongue, that a seat belt is inserted into, with the buckle fixed to the buckle anchor. In this case, it is a buckle switch that detects whether the tongue is in engagement with the buckle and supplies a signal that is turned ON when they are in engagement, which is well known.

In the third embodiment, since the ON signal from the seatbelt extraction amount sensor is effective only when the signal from the buckle switch is ON, the sensor does not judge the object loaded on the seat as being a child restraint system when the seatbelt is unwound without being fastened.

According to a fourth embodiment of the present invention, an occupant sensor is provided. The sensor configured as described in any of the three embodiments mentioned above further arranged so that the seatbelt extraction amount sensor is integrated into a locking mechanism of an ALR retractor or an ELR retractor with ALR switch function.

The ALR retractor is one of the seatbelt retracting devices, and is also called as an automatic locking safety belt retractor. This is constructed in such a manner that when a predetermined amount of seatbelt is unwound, the rotation of the winding mechanism in the direction in which the seatbelt is unwound is locked and thus further unwinding operation is prevented while allowing only winding operation. The ELR retractor with ALR switch function is for example the one disclosed in Japanese Examined Utility Model Publication No. 4-15557 (incorporated by reference herein in its entirety), which is constructed in such a manner that it works as a normal emergency locking safety belt retractor (ELR) until the seatbelt is unwound by a predetermined amount, and when the seat belt is unwound by a predetermined amount, it works as an ALR retractor.

Both types of the seatbelt retractor have a mechanism for detecting that the seatbelt is unwound by a predetermined amount (normally full amount or near full amount) and for locking further unwinding operation thereof. Therefore, by providing a limit switch to the locking mechanism and using it as a seatbelt extraction amount sensor, the mechanism of the seatbelt extraction amount sensor can be simplified.

According to a fifth embodiment of the present invention, an occupant sensor is provided. The sensor is arranged according to any one of the first to third embodiments mentioned above and is configured so that the seatbelt extraction amount sensor is an ALR switch sensor of the ELR retractor with ALR switch function.

The ELR retractor with ALR switch function works as an normal emergency locking safety belt retractor (ELR) till the seatbelt is unwound by a predetermined amount, and works as an automatic locking safety belt retractor (ALR) once the seatbelt is unwound by a predetermined amount. In this ALR state, further unwinding operation is locked and only winding operation is possible. In case an ALR switch sensor for detecting that the seatbelt is unwound by the predetermined amount is employed, the sensor can be used as a seatbelt extraction amount sensor, even if no particular extraction amount sensor is employed.

It is to be understood that both the foregoing general description and embodiments mentioned above and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
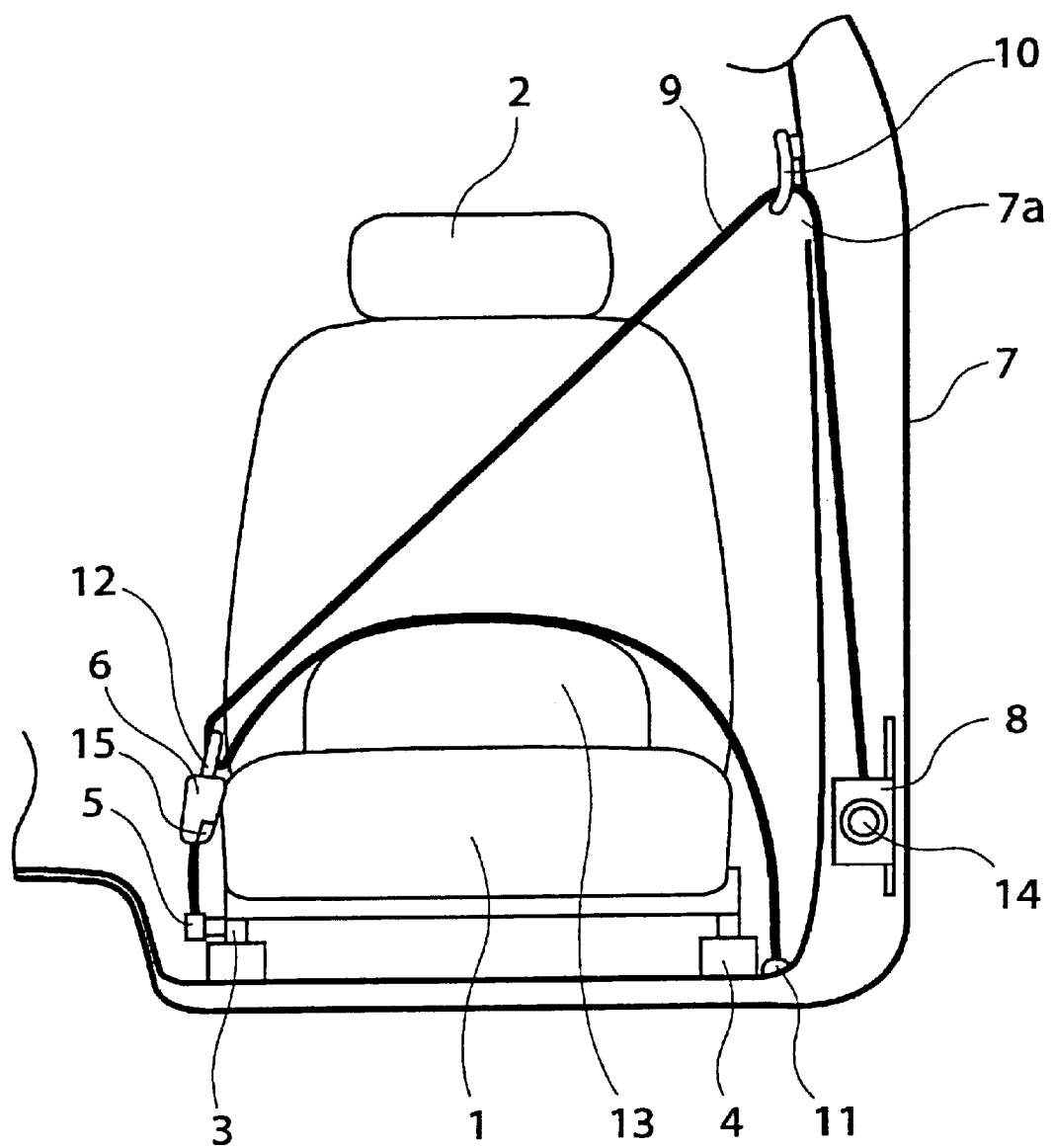
FIG. 1 is a drawing showing an example of the embodiment according to the present invention.

Referring now to the drawings, the present invention will be further illustrated with examples below. FIG. 1 is a drawing showing an example of the embodiment according to the present invention. The seat cushion 1 and the seatback 2 are supported by the seat rail via the side frame 3, and there is provided a seat load sensor 4 below the seat rail. The side frame 3 is provided with a buckle anchor 5, and the buckle anchor 5 is in turn provided with a buckle 6. A buckle switch 15 is mounted in the buckle 6. The switch 15 is turned ON when the buckle 6 and the tongue 12 engages.

As shown in FIG. 1, a seatbelt retracting device 8 is provided in the pillar 7 of the vehicle body, and the seatbelt 9 extending therefrom is routed through the opening 7a of the pillar 7 toward the cabin, and fixed to the outer anchor 11 via the shoulder anchor 10. The intermediate section of the seatbelt 9 between the shoulder anchor 10 and the outer anchor 11 is passed through the hole on the tongue 12.

When fastening the seatbelt, the user pulls the seatbelt 9 while holding the tongue 12 and engages the tongue 12 with the buckle 6. When he/she takes the seatbelt off, the seatbelt 9 is wound by the seatbelt retracting device 8 to give an adequate tensile force, and restrains an occupant or a child restraint system 13 on the seat.

Figure 4:
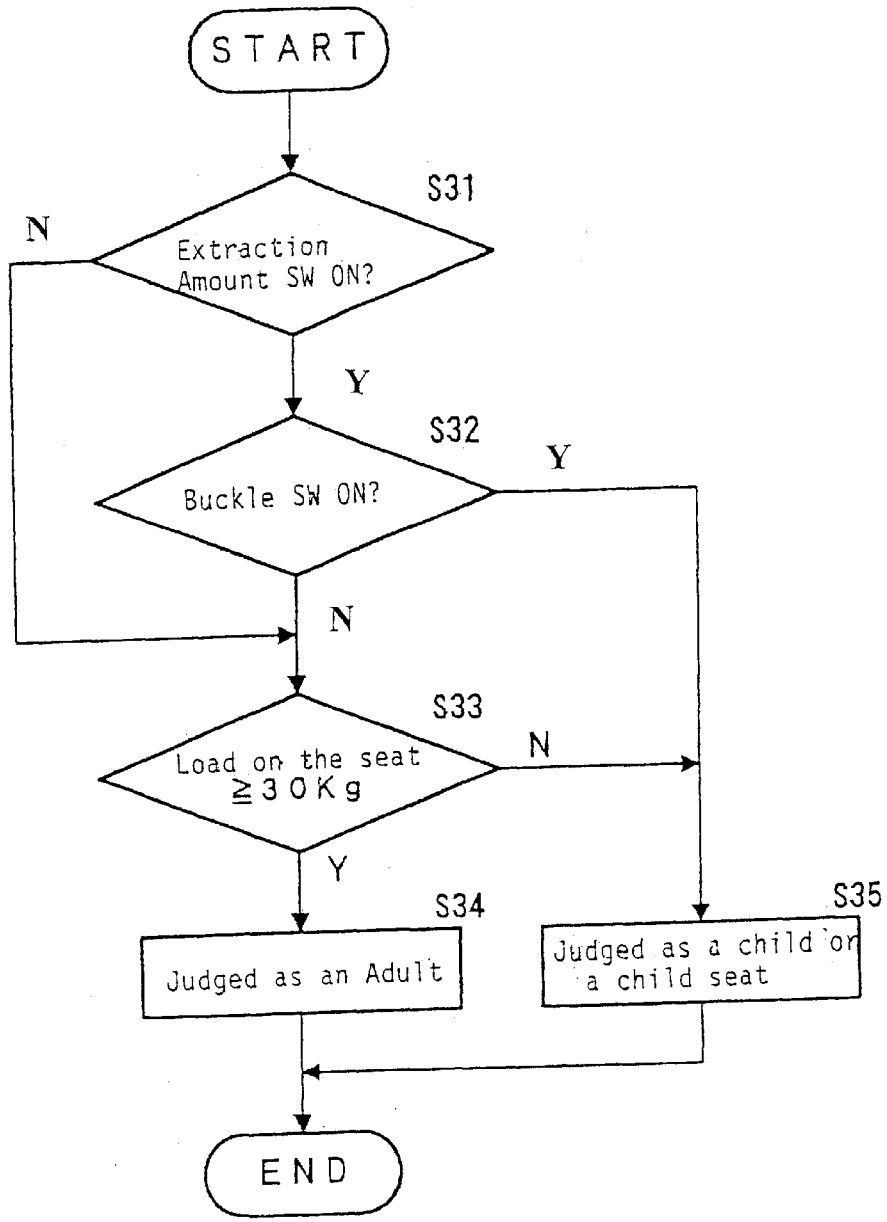
FIG. 4 is a flow chart showing the third example of the action of the occupant sensor.

The seatbelt retracting device 8 is provided with a seatbelt extraction amount sensor 14, and the signal supplied therefrom is turned ON when the seatbelt 9 is unwound by a predetermined amount. In the exemplary embodiment shown in FIG. 1, a rotary encoder is mounted on the spool of the seatbelt retracting device 8 so that the extracting amount of the seatbelt 9 is detected by the output supplied therefrom. When the detected extracting amount of the seatbelt reaches a predetermined value, ON signal is outputted. The seatbelt extraction amount sensor 14 may also be constructed as a limit switch mounted on a braking lever as shown in FIG. 4 of Japanese Examined Utility Model Publication No. 4-15557, so that the limit switch is turned on when the seatbelt is unwound by a predetermined amount and the braking lever is actuated.

The function of such an occupant sensor mounted in a seat will now be described. Since the occupant sensor may constructed to include a microprocessor as a main component, the operation of the sensor will be primarily be described referring the flow charts shown in FIGS. 2–4.

Figure 2:
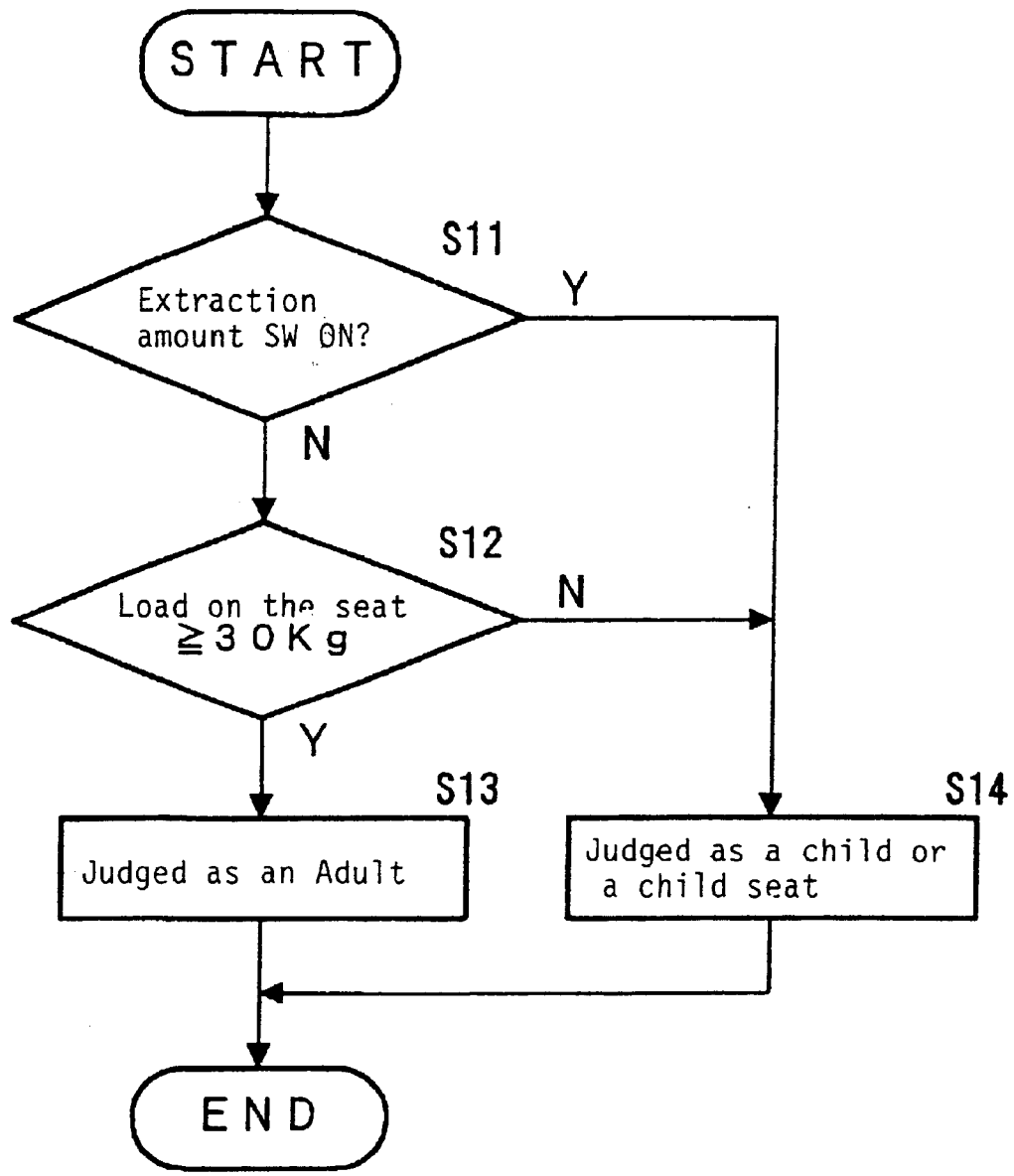
FIG. 2 is a flow chart showing the first example of the action of the occupant sensor.

FIG. 2 is a flow chart showing the first example of the action of the occupant sensor. The flow chart is actuated every predetermined time period. In Step S11, a determination is made whether or not the seatbelt extraction amount sensor (switch) is ON.

When the switch is ON, or when the predetermined amount or more seatbelt 9 is unwound, the object loaded on the seat is judged as being a child restraint system. Then the procedure moves to Step S14, and the occupant is judged as being a child or a child restraint system.

When the seatbelt extraction amount sensor is not ON, the procedure is moved to Step S12, and whether or not the value of load detected by the seat load sensor is not less than 30 kg is judged. When it is not less than 30 kg, the procedure moves to Step S13, and the occupant is judged or determined to be an adult. When it is less than 30 kg, the procedure moves to Step S14, and the occupant is judged as being a child or a child restraint system.

Figure 3:
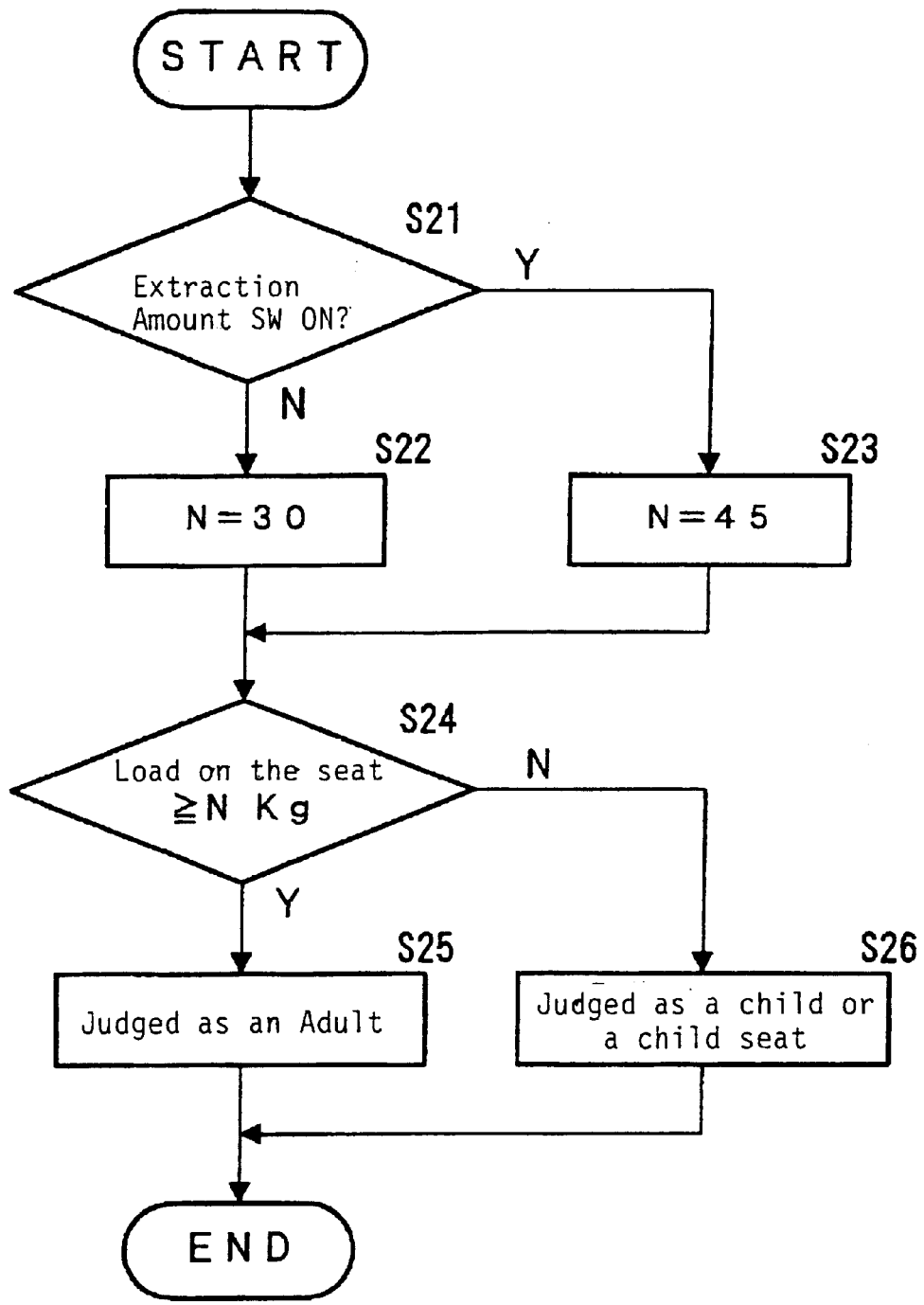
FIG. 3 is a flow chart showing the second example of the action of the occupant sensor.

FIG. 3 is a flow chart showing the second example of the action of the occupant sensor. This flow chart is actuated every predetermined time period. In Step S21, a determination is made whether or not the seatbelt extraction amount sensor (switch) is ON.

When it is ON, or when the seatbelt 9 is unwound by not less than the predetermined amount, the procedure is moved to Step S23, and the threshold value N to be used as a criterion of judgment is set to the larger value, 45 kg. When the seatbelt extraction amount sensor is not ON, the procedure moves to Step S22, and the threshold to be used as a criterion of judgment is set to the normal value, 30 kg.

In any cases, the procedure moves to Step S24, and whether or not the value of load detected by the seat load sensor is not less than the threshold values N determined in Steps S22 and S23 each respectively is judged. When the load is not less than N, the procedure moves to Step S25, and the occupant is judged as being an adult. When the load is less than N, the procedure moves to Step S26, and the occupant is judged or determined to be a child or a child restraint system.

FIG. 4 is a flow chart showing the third example of the action of the occupant sensor. This flow chart is actuated every predetermined time period. In Step S31, a determination is made whether or not the seatbelt extraction amount sensor (switch) is ON.

When it is ON, or when the seatbelt 9 is unwound by not less than the predetermined amount, the procedure moves to Step S32, and a determination is made whether or not the buckle switch 15 is ON, or whether or not the buckle 6 and the tongue 12 engages.

When the buckle switch 15 is ON, it is judged or determined that a child restraint system is being mounted, the procedure moves to Step 35, and the occupant is judged as being a child or a child restraint system. When the buckle switch 15 is not ON, the procedure moves to Step S33.

When it is determined that the seatbelt extraction amount sensor is not ON in Step S31, the procedure moves directly to Step S33. In Step S33, a judgment is made whether or not the value of the load detected by the seat load sensor is not less than 30 kg. When the load is not less than 30 kg, the procedure moves to Step S34, and the occupant is judged as being an adult. When the load is less than 30 kg, the procedure moves to Step S35, and the occupant is judged as being a child or a child restraint system.

Actions shown in the flow chart of FIG. 3 and FIG. 4 may be combined. That is, When Step 31 results in Yes, the threshold value in Step S33 may be set to N=45. When No results from Step S32, the threshold value for Step S33 may be set as N=30.

Though there is provided a particular seatbelt extraction amount sensor in this embodiment, in the case where the seatbelt retracting device is an ALR retractor or an ELR retractor with ALR switch function, it is not necessary to provide a particular seatbelt extraction amount sensor by utilizing the switch function as a seatbelt extraction amount sensor.

Figure 5:
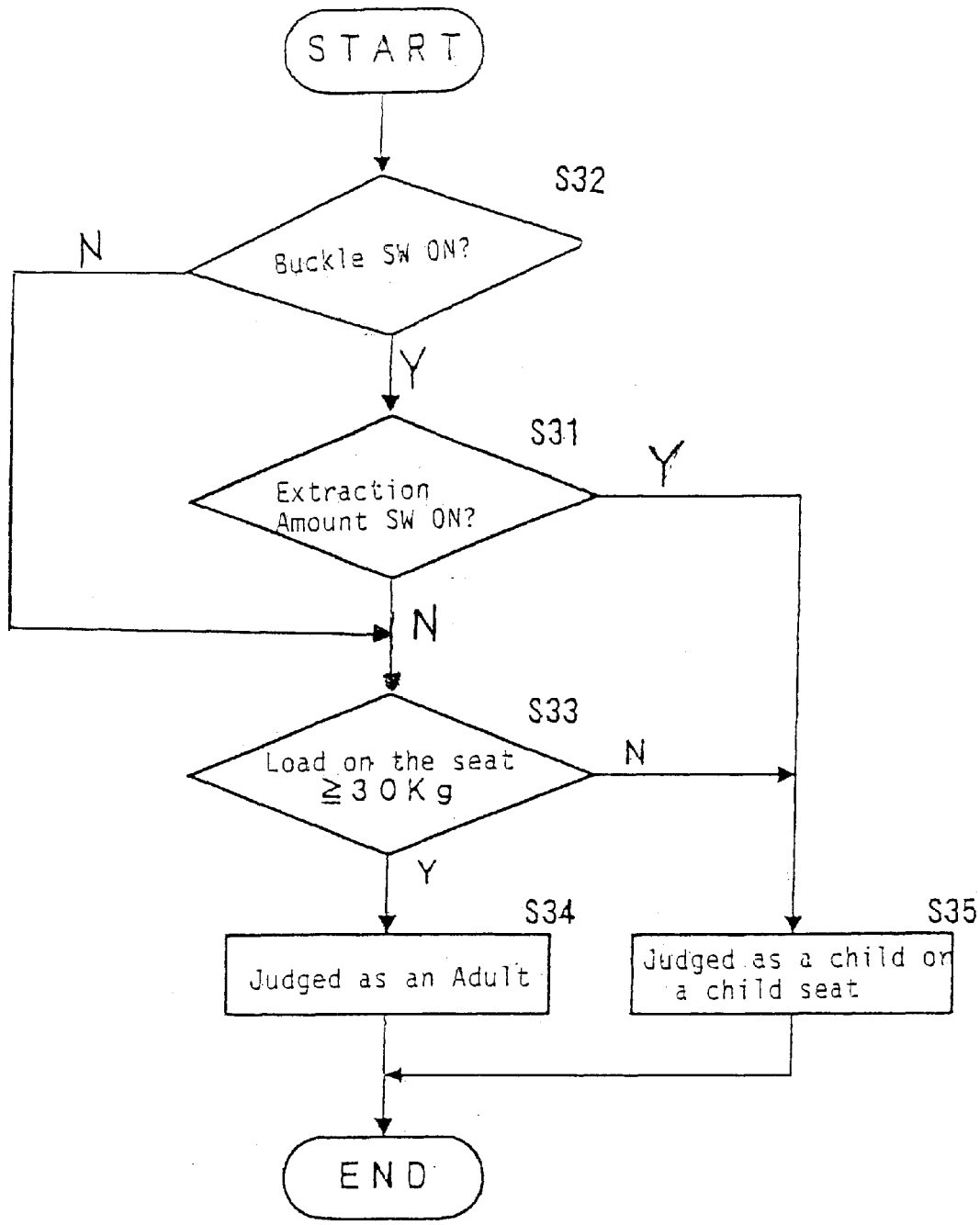
FIG. 5 is a flow chart showing an alternative embodiment of an occupant sensor according to the present invention.

According to an alternative embodiment of the present invention, Steps S31 and S32 may be reversed, as shown in FIG. 5. As a result, the ON signal from the seatbelt extraction amount sensor is only considered by the occupant sensor when signal from the buckle switch is ON.

As described above, in the embodiments of the present invention, whether the object on the seat is a child restraint system or an adult can reliably identified even when the child restraint system is fixed by using a seatbelt.

In addition to this advantage, in the present invention, judgment of a child restraint system as being mounted when the seatbelt is unwound without the seatbelt being fastened is prevented.

In addition to these advantages, in the present invention, the mechanism of the seatbelt extraction amount sensor can be simplified. According to the present invention, it is not necessary to provide a particular seatbelt extraction amount sensor.

The priority application JP 2001-354732 filed on Nov. 20, 2001 is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant sensor for identifying the category of an occupant and the presence of a child restraint system on a seat of a passenger vehicle, comprising:
   a seat load sensor for detecting the weight of the occupant seated on the seat or the object loaded on the seat, and
   a seatbelt extraction amount sensor for detecting the extracting amount of the seat belt is not less than a predetermined amount;
   wherein the occupant sensor is configured so that
   (1) when the detected signal of the seatbelt extraction amount sensor is ON, the occupant sensor determines that a child restraint system is located on the seat irrespective of the value of the seat load sensor; and
   (2) when the detected signal of the seatbelt extraction amount sensor is OFF,
      (a) and when the value from the seat load sensor is less than a predetermined value, the occupant sensor determines that the object loaded on the seat is a child restraint system or a child; and
      (b) when the value from the seat load sensor is not less than the predetermined value, the occupant sensor determines that the object loaded on the seat is judged is an adult.

2. An occupant sensor according to claim 1, further comprising
 a buckle switch for detecting engagement between a buckle and
 a tongue of the seat belt,
 wherein the ON signal from the seatbelt extraction amount sensor is only considered by the occupant sensor when the signal from the buckle switch is ON.

3. An occupant sensor according to claim 1,
 wherein the seatbelt extraction amount sensor is integrated into a locking mechanism of an ALR retractor or an ELR retractor with ALR switch function.

4. An occupant sensor according to claim 1,
 wherein the seatbelt extraction amount sensor is an ALR switch sensor of the an ELR retractor with ALR switch function.

5. An occupant sensor for identifying the category of an occupant and the presence of a child restraint system on the seat of a passenger vehicle, comprising:
 a seat load sensor for detecting the weight of the occupant seated on the seat or the object loaded on the seat,
 a seatbelt extraction amount sensor for detecting that the extracting amount of the seat belt is not less than a predetermined amount,
 a buckle switch for detecting engagement between a buckle, and a tongue of the seat belt
 wherein
  (a) when the value from the seat load sensor is less than a predetermined value, the object loaded on the seat is judged as being a child restraint system or a child; and
  (b) when the value from the seat load sensor is not less than the predetermined value, the object loaded on the seat is judged as being an adult; and
 wherein when the detected signal of the seatbelt extraction amount sensor is ON, the predetermined value is set to a larger value than the case where it is OFF; and
 wherein the ON signal from the seatbelt extraction amount sensor is only considered by the occupant sensor when the signal from the buckle switch is ON.

6. An occupant sensor according to claim 5,
 wherein the seatbelt extraction amount sensor is integrated into a locking mechanism of an ALR retractor or an ELR retractor with ALR switch function.

7. An occupant sensor according to claim 5,
 wherein the seatbelt extraction amount sensor is an ALR switch sensor of the an ELR retractor with ALR switch function.

8. A method of determining whether an object on a seat of a vehicle is child, child restraint system or an adult, comprising the steps of:
 detecting a weight of the object on the seat, and
 detecting when a seat belt buckle is engaged with a tongue of a seat belt and only if the buckle and the tongue are engaged detecting whether an extracting amount of the seat belt is not less than a predetermined amount;
 determining that the object loaded on the seat is a child restraint system or a child when the weight of the object is less than a predetermined value;
 determining that the object loaded on the seat is an adult when the weight of the object is not less than the predetermined value; and
 setting the predetermined value to a larger value when the extracting amount of the seat belt is not less than the predetermined amount.

9. A method of determining whether an object on a seat of a vehicle is a child, child restraint system or an adult, comprising the steps of:
 detecting a weight of the object on the seat,
 detecting whether an extracting amount of the seat belt is not less than a predetermined amount;
 determining that a child restraint system is located on the seat irrespective of the weight of the object on the seat when the extracting amount of the seat belt is not less than a predetermined amount;
 determining that a child restraint system or child is on the seat when the seatbelt extracting amount is less than the predetermined amount, and when the weight of the object is less than a predetermined value; and
 determining that an adult is on the seat when the seatbelt extracting amount is less than the predetermined amount and when the weight of the object is not less than the predetermined value.

* * * * *